(12) United States Patent
Taskin et al.

(10) Patent No.: US 9,773,079 B2
(45) Date of Patent: Sep. 26, 2017

(54) METHODS AND COMPUTER-READABLE MEDIA FOR SYNTHESIZING A MULTI-CORNER MESH-BASED CLOCK DISTRIBUTION NETWORK FOR MULTI-VOLTAGE DOMAIN AND CLOCK MESHES AND INTEGRATED CIRCUITS

(71) Applicants: Baris Taskin, Philadelphia, PA (US); Ahmet Can Sitik, Philadelphia, PA (US)

(72) Inventors: Baris Taskin, Philadelphia, PA (US); Ahmet Can Sitik, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/697,864

(22) Filed: Apr. 28, 2015

(65) Prior Publication Data
US 2015/0310153 A1 Oct. 29, 2015

Related U.S. Application Data

(60) Provisional application No. 61/985,657, filed on Apr. 29, 2014.

(51) Int. Cl.
*G06F 17/50* (2006.01)
(52) U.S. Cl.
CPC ...... *G06F 17/5031* (2013.01); *G06F 17/5036* (2013.01); *G06F 2217/62* (2013.01); *G06F 2217/84* (2013.01)

(58) Field of Classification Search
CPC ............. G06F 17/5031; G06F 17/5036; G06F 2217/84; G06F 2217/62
(Continued)

(56) References Cited

U.S. PATENT DOCUMENTS 5,369,640 A 11/1994 Watson et al.
7,117,466 B2 * 10/2006 Kalafala ............. G06F 17/5031
716/108

(Continued)

OTHER PUBLICATIONS

Chen, Adaptive Clock Design for Memory Intensive 3D Integrated Circuits (Ph.D. dissertation, North Carolina State University) (2011).

(Continued)

*Primary Examiner* — Jack Chiang
*Assistant Examiner* — Brandon Bowers
(74) *Attorney, Agent, or Firm* — Saul Ewing LLP; Kathryn Doyle; Brian R. Landry (57) ABSTRACT

One aspect of the invention provides a including: (a) placing N×N max size buffers at an (n−1)st level of one of the voltage domains i until a maximum slew $slew_{max}$ within the voltage domain i exceeds a defined slew threshold; (b) calculating maximum insertion delay values for all cases for each of the voltage domains; (c) if the maximum insertion delay values for all cases are associated with a single voltage domain j: (i) adding a max size buffer to all voltage domains except voltage domain j; and (ii) repeating steps (b) and (c); (d) reducing buffer sizes for each of the voltage domains; (e) recalculating maximum insertion delay values; and (f) adding parallel buffers to a first level of the voltage domain having a highest maximum insertion delay until the calculated skew across the plurality of voltage domains no longer improves.

3 Claims, 5 Drawing Sheets

(58) Field of Classification Search
USPC .......................................................... 716/108
See application file for complete search history.

(56) References Cited

U.S. PATENT DOCUMENTS

2011/0084775 A1    4/2011  Papaefthymiou et al.
2016/0140280 A1*   5/2016  Arp .......................... G06F 1/10
                                                          716/108

OTHER PUBLICATIONS

Curran, et al., "Power-Constrained High-Frequency Circuits for the IBM Power6 Micrprocessor," IBM J. Res. & Dev. vol. 51, No. 6 (Nov. 2007).
Lee, "High-Performance and Low-Power Clock Network Synthesis in the Presence of Variation," (Ph.D. dissertation, The University of Michigan) (2011).
Sitik & Taskin, "Multi-Voltage Domain Clock Mesh Design", in Proceedings of the IEEE International Conference on Computer Design (ICCD) 201-06 (Oct. 2012).
Sitik & Taskin, "Implementation of Domain-Specific Clock Meshes for Multi-Voltage SoCs with IC Compiler", in Proceedings of Synopsys User Groups Conference (SNUG) Silicon Valley (Mar. 2013).

* cited by examiner

FIG. 5 under a fixed nominal case can no longer provide enough timing variation tolerance due to the larger dynamic range between the best case and the worst case.

METHODS AND COMPUTER-READABLE MEDIA FOR SYNTHESIZING A MULTI-CORNER MESH-BASED CLOCK DISTRIBUTION NETWORK FOR MULTI-VOLTAGE DOMAIN AND CLOCK MESHES AND INTEGRATED CIRCUITS

CROSS-REFERENCE TO RELATED APPLICATION

This application claims priority under 35 U.S.C. §119(e) to U.S. Provisional Patent Application Ser. No. 61/985,657, filed Apr. 29, 2014. The entire content of this application is hereby incorporated by reference herein.

BACKGROUND

In high performance integrated circuit (IC) clock design, the tradeoff between the performance and the power consumption is well-studied. In application-specific integrated circuit (ASIC) design, clock tree topologies are preferred due to their low power profile with less wire demand and flexibility to be combined with low power techniques such as multi-voltage domain design. On the other hand, in high-end microprocessor design, clock topologies with redundancies are preferred due to their tolerances against process variations with the cost of extra wire capacitance. In the clock tree topologies with spines and crosslinks, selected branches are shorted to decrease the skew mismatch in the presence of variations, whereas in clock mesh topologies, every branch is shorted in the design to provide a global improvement of the skew.

SUMMARY OF THE INVENTION

One aspect of the invention provides a method of synthesizing a multi-corner mesh-based clock distribution network for a multi-voltage domain. The includes: (a) for each of a plurality of voltage domains, placing N×N max size buffers at an (n−1)st level of one of the voltage domains i until a maximum slew $slew_{max}$ within the voltage domain i exceeds a defined slew threshold; (b) calculating maximum insertion delay values for all cases for each of the voltage domains; (c) if the maximum insertion delay values for all cases are associated with a single voltage domain j: (i) adding a max size buffer to all voltage domains except voltage domain j; and (ii)repeating steps (b) and (c); (d) reducing buffer sizes for each of the voltage domains, in order of decreasing skew, by: (i) downsizing all buffers in a k-th level of the voltage domain; (ii) if the downsizing step (i) does not improve a calculated skew across the plurality of voltage domains, (1) undoing the downsizing step (i) and (2) performing substep (i) for the k+1th level of the voltage domain; and (iii) otherwise, repeating substep (i); (e) recalculating maximum insertion delay values for all cases for each of the voltage domains; and (f) adding parallel buffers to a first level of the voltage domain having a highest maximum insertion delay until the calculated skew across the plurality of voltage domains no longer improves.

This aspect of the invention can have a variety of embodiments. "All cases" can include a best case, a nominal case, and a worst case. The calculated skew can be the largest difference between a maximum insertion delay and a minimum insertion delay within one of the voltage domains. The method can be a computer-implemented method.

Another aspect of the invention provides a tangible, non-transitory computer readable medium comprising computer program instructions for implementing any of the methods described herein.

Another aspect of the invention provides a clock mesh synthesized according to any of the methods described herein.

Another aspect of the invention provides an integrated circuit including any of the clock meshes as described herein.

This aspect of the invention can have a variety of embodiments. The integrated circuit can be an application-specific integrated circuit.

Another aspect of the invention provides an integrated circuit including: a clock mesh topology having multiple voltage islands sharing a single clock domain.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DEFINITIONS

The instant invention is most clearly understood with reference to the following definitions:

As used herein, the singular form "a," "an," and "the" include plural references unless the context clearly dictates otherwise.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

DETAILED DESCRIPTION OF THE INVENTION

Literature on clock meshes focuses on design methodologies for mesh reduction and optimization, and ignores multi-corner analysis, as the ubiquitous shorting of branches provides remarkable robustness under process-voltage-temperature (PVT) variations. However, this assumption only holds true for a traditional, single-Vdd clock mesh. When a system-on-chip style multi-Vdd single clock domain design is considered, or for a design employing the low power technique of multi-voltage design, a clock network built with the mesh-topology becomes uncharacteristically susceptible to PVT variations. This susceptibility emerges as a multi-voltage clock mesh is constructed with disjoint pre-mesh trees and meshes, each synchronizing an individual voltage domain.

This application introduces a novel multi-voltage domain clock mesh design methodology that is effective under multiple process corners. In multi-voltage designs, a single clock mesh that spans multiple voltage domains is infeasible due to the incompatibility of voltage levels of the clock drivers on the electrically-shorted mesh because each voltage domain requires a separate mesh. The skew among these isolated meshes need to be matched and a novel pre-mesh tree synthesis is required to tolerate the impact of PVT variations exacerbated by the separation of clock meshes for multiple voltage levels.

A novel multi-corner multi-voltage clock mesh design methodology is provided. Multi-voltage clock mesh design is not a straight-forward process. First, a single clock mesh is not feasible as its electrically-shorted mesh wires cannot drive the voltage sinks operating at different voltage levels. Separate meshes are needed for each domain. Second, the skew among these domains must be balanced, which is a challenge that arises due to the isolation of the pre-mesh trees among the voltage domains. Third, the skew introduced by the variation must be analyzed and tuned considering multiple process corners, as isolated pre-mesh trees in different voltage domains have different tolerances against the PVT variations.

Prior approaches failed to consider the third objective of variation-tolerance. Variation-awareness of the multi-voltage clock mesh topology necessitates a novel design scheme described herein to alleviate the impacts on timing variation, which are further exacerbated due to the presence of multiple voltage domains. This novel methodology addresses all three of these objectives concurrently to synthesize a variation-tolerant, power-efficient multi-voltage domain clock network.

Experiments performed on the largest circuits of the ISCAS'89 benchmarks with 90 nm models at 500 MHz highlights two important benefits of multi-corner multi-voltage domain clock mesh design. First, the disclosed multi-corner multi-voltage domain clock mesh can achieve up to 42% lower power at three process corners with a 39.04 picosecond (ps) skew on average, that resides in the 2% budget of the clock period. Second, the disclosed method can achieve 190.42 ps lower skew in average and a much tighter slew compared to optimizing multi-voltage domain clock mesh design at only one process corner, with a 15% degradation in the power consumption at that corner (but functional as the skew is corrected not to be larger than an allowable skew budget).

Clock Mesh Design

Figure 1A:
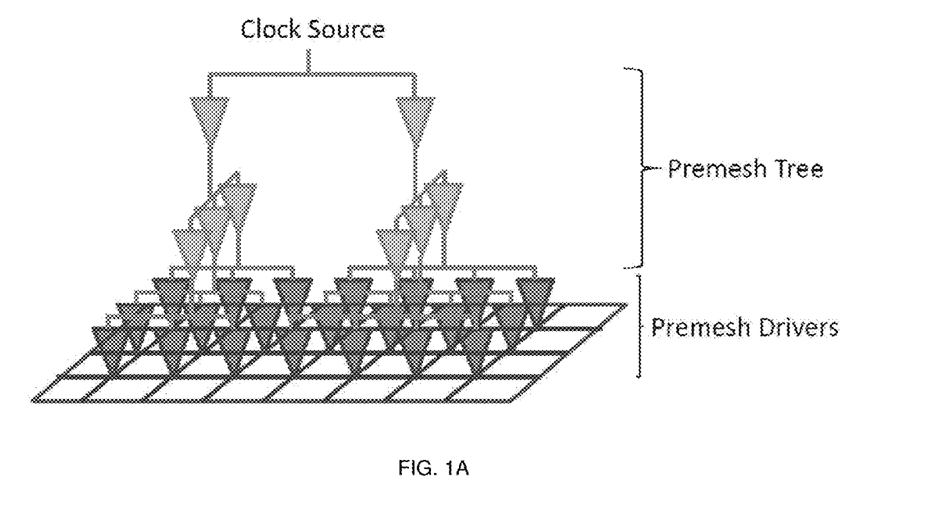
FIG. 1A depicts a typical single-voltage domain clock mesh topology.
Figure 1B:
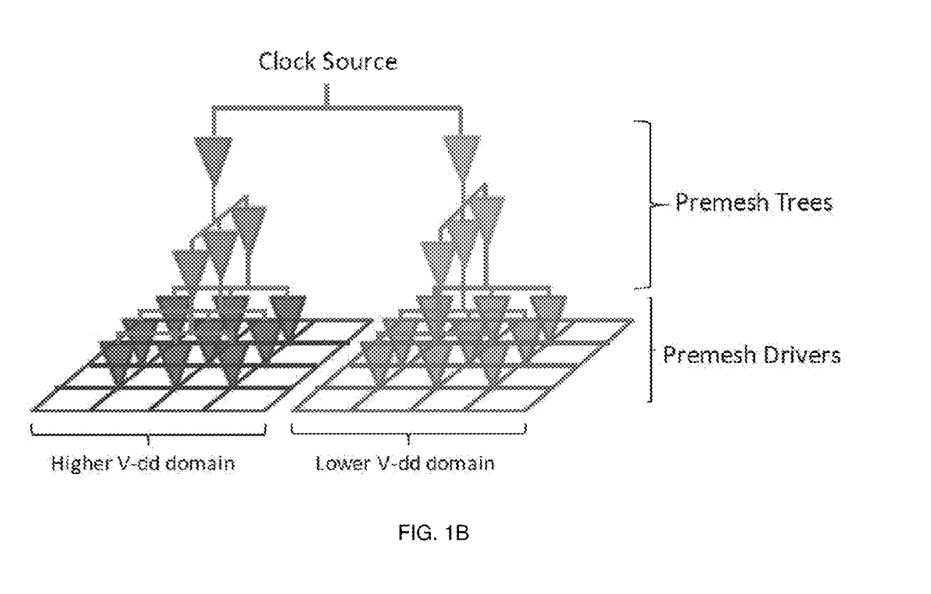
FIG. 1B depicts a multi-voltage domain clock mesh topology according to an embodiment of the invention.

There are two major design specifications of the clock mesh design shown in FIGS. 1A and 1B. First is the power consumption, introduced by the resistive-capacitive (RC) effect of the redundant mesh wires, and the second is the clock skew, introduced by the variations and geometric mismatches.

Power Dissipation in Clock Mesh

The power consumption of a clock mesh can be approximated as follows:

$$P_{total} \approx \alpha c_{total} f V_{dd}^2 \qquad (1)$$

where is the switching factor, f is the operating frequency, and $V_{dd}$ is the supply voltage. The switching capacitance $c_{total}$ is:

$$c_{total} \approx c_{mesh} + c_{stub} + c_{pmt} + \sum_{\forall i} c_i \qquad (2)$$

where the last term represents the total capacitance of the sink registers, and $c_{mesh}$, $c_{stub}$, and $c_{pmt}$ are the total capacitance of the mesh wires, stub wires, and the pre-mesh tree, respectively.

Under the same switching activity and the same frequency f, there are two ways to decrease the power dissipation of the synthesized clock mesh network. The first approach is to decrease the total capacitance through mesh wire reduction, stub wire reduction, or both. The second approach is supply voltage reduction, which can be realized using multi-voltage domains as described herein. Although multi-voltage mesh has unique challenges, it is more promising than capacitance reduction because: (1) most of the switching capacitance is at the clock sinks, and thus, mesh or stub wire length reduction does not reduce the dominant switching capacitance component, and (2) supply voltage reduction scales power quadratically, rather than linearly. Besides, voltage domains are not proposed to exclusively reduce the clock power but as a necessity due to the voltage domains being created for the logic (e.g., an System on a Chip (SoC) or multi-Vdd design) and not for the clock itself. It is an added incentive that these multiple voltage domains can help reduce the power dissipation of a clock mesh. The culprit is the undesired increase in clock skew between the meshes on each individual voltage domain, which is addressed by the invention disclosed herein.

Skew in Clock Mesh

The global clock skew in the mesh is estimated as:

$$t_{skew} = t_{skew}^{pmt} + t_{skew}^{mesh} + t_{skew}^{stub} \qquad (3)$$

where $t_{skew}^{pmt}$, $t_{skew}^{mesh}$, and $t_{skew}^{stub}$ are the skews introduced by the difference between the maximum and the minimum delays on the pre-mesh tree of the mesh, the difference between the maximum and the minimum delays on the mesh from a pre-mesh driver to a stub wire connection point on the mesh, and the difference between the maximum and the minimum delays from a connecting point of a stub wire to a sink register, respectively. The skew introduced by $t_{skew}^{mesh}$ and $t_{skew}^{stub}$ can be reduced by using dense meshes in each domain, however, decreasing the skew introduced by $t_{skew}^{pmt}$ is a challenge for multi-voltage meshes because the pre-mesh trees depicted in FIG. 1B are isolated.

Insertion Delay and Its Variation in Multi-Voltage Designs

Any multi-voltage clocking algorithm has the following challenges. First, the gate delay changes with the switching of the supply voltage between voltage domains. Second, the variation in the gate delay is not the same for the identical gates with different supply voltages. Clock skew is defined as the difference between the maximum and the minimum insertion delays, which may fall on different branches within separate voltage domains. To that end, aspects of the invention investigate the insertion delay profile of a clock mesh network to optimize the skew and provide methods and computer-readable media to design these pre-mesh tree branches within separate voltage domains in the presence of PVT variations of multiple process corners.

Figure 2:
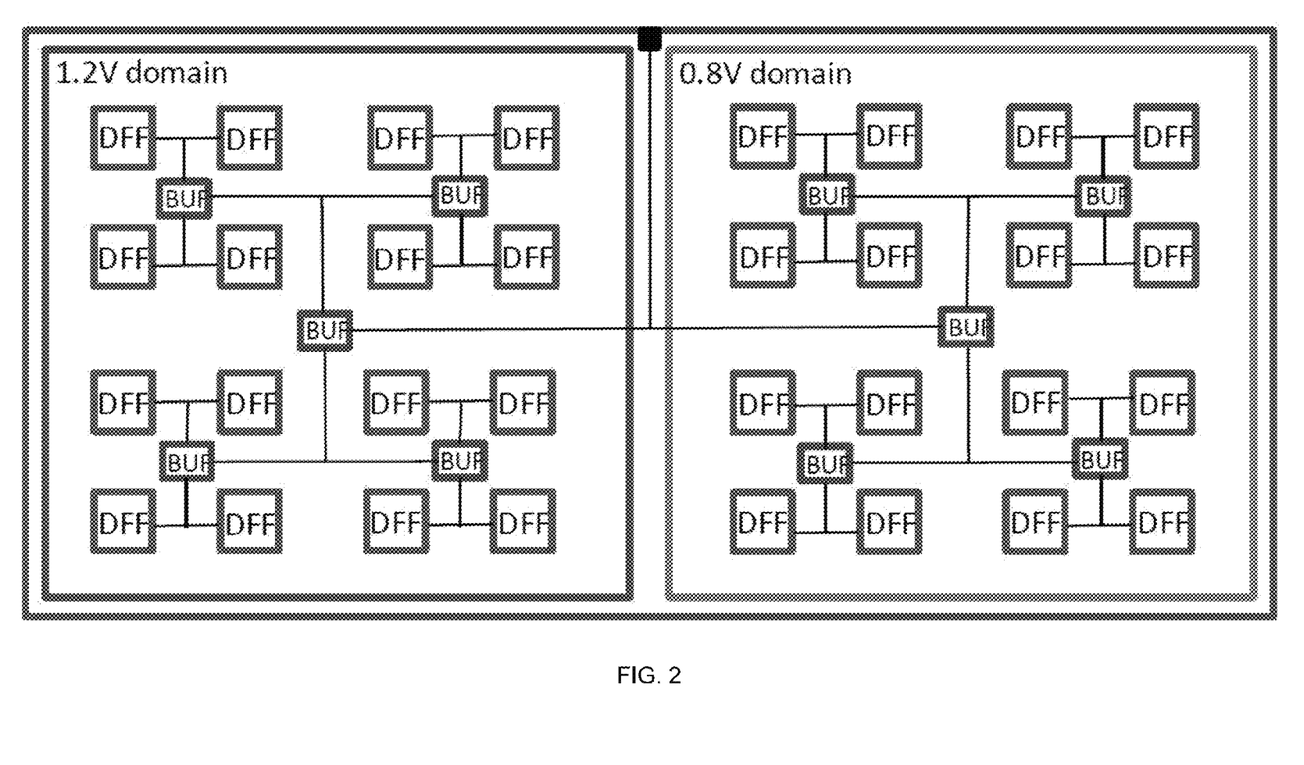
FIG. 2 depicts a simple 2-level clock tree with 16 sinks according to an embodiment of the invention.

In order to analyze how the insertion delay varies depending on the applied voltage, an example is presented with 2 voltage domains, each with a simple 2-level clock tree with 16 sinks, as depicted in FIG. 2. In this motivational example, one domain is supplied with 1.2V and the other is with 0.8V, and SPICE models of the SYNOPSYS® SAED 90 nm EDK library available from the Synopsys, Inc. of Mountain View, Calif. are used. This simple example is synthesized by the SYNOPSYS® IC COMPILER™ software using clock buffers of the same size. This circuit is simulated in the SYNOPSYS® CUSTOMSIM™ XA simulator at 500 MHz, and the insertion delay is measured in 3 different process corners: the best, nominal and the worst cases of the process. The insertion delay profile monitored is shown in Table 1.

TABLE 1

Insertion delay profile of the clock tree example at two domains in FIG. 2. The maximum and minimum delays that define the global skew are denoted in bold font.

|  | Best (ps) | Nom (ps) | Worst (ps) |
| --- | --- | --- | --- |
| Min insertion delay in 0.8 V D. | 104.73 | 157.77 | 301.71 |
| Max insertion delay in 0.8 V D. | 106.64 | 161.50 | 309.57 |
| Increase compared to Best | — | ≈55 | ≈203 |
| Min insertion delay in 1.2 V D. | 101.36 | 130.71 | 223.46 |
| Max insertion delay in 1.2 V D. | 101.65 | 131.29 | 224.65 |
| Increase compared to Best | — | 30 | 122 |
| Global Skew | 5.28 | 30.79 | 86.11 |

As seen in Table 1, the insertion delay variation is higher in the 0.8V domain, which also increases the skew switching from the best case to the worst case due to the maximum insertion delay increasing by 203 to 309.57 ps, whereas the minimum insertion delay only increases by 122 to 223.46 ps. In this undesirable case, the maximum insertion delay increase is the largest because it is affected the most by PVT variations from the best to worst case. The minimum insertion delay, on the other hand, increases the least, which is also undesirable. It is desirable, instead, that the maximum insertion delay path be delayed the least and the minimum insertion delay be delayed the most, to contain the skew under PVT variations from the best to the worst case.

The basis for the novel pre-mesh tree methodology described herein is that the maximum insertion delay path should be intentionally placed in the higher voltage domain at the best case because paths in the higher voltage domain are affected less by PVT variations and the skew budget is lower at all corners. To demonstrate this postulate, the insertion delay of the 1.2V domain is increased gradually by upsizing the first level of the two-level motivational clock tree first, and then both levels together to observe these two desirable delay profiles. It is expected that the insertion delay in the 1.2V domain increases by a delay offset in all PVT corners, which may increase the skew in the best case corner, but decrease the skew in the worst case, which results in a decrease in the global skew.

As seen in Table 2, the global skew is decreased when the insertion delay is gradually increased in the 1.2V domain by upsizing the clock buffers. It is clear that a novel clock network synthesis methodology should control the insertion delay of the different domains by either adding/removing buffers or upsizing/downsizing over a naive, single-corner optimized tree. Notably, the minimum and the maximum insertion delays (marked in bold) are consistently in the same voltage domain in all three corners in the undesired case, shown in Table 1. In the desired case, shown in Table 2, the delays vary between paths in either voltage domains for PVT corners, the skew being affected less from PVT variations. Although the skew is increased in the best corner (from 5.28 ps to 25.4 ps), global skew is defined as the worst case of all corners. Thus, global skew is improved from 86.11 ps to 39.47 ps when the insertion delay is shifted by an upsizing. This example indicates that optimizing the skew at all three corners simultaneously requires an early arrival of the clock signal in the lower voltage domain at the best case so as to have a balanced skew at the worst case, and for the skew budget to be lower. The multi-corner optimized pre-mesh tree synthesis methodology for the multi-voltage clock mesh designs described herein fills this gap.

TABLE 2

Improved skew numbers with a delay offset in the insertion delay of the 1.2 V domain

|  | Only first level upsized by one | | | Both two levels upsized by one | | |
| --- | --- | --- | --- | --- | --- | --- |
|  | best (ps) | nom (ps) | worst (ps) | best (ps) | nom (ps) | worst (ps) |
| Min insertion delay in 0.8 V domain | 104.64 | 157.52 | 301.12 | 104.64 | 157.51 | 301.16 |
| Max insertion delay in 0.8 V domain | 106.53 | 161.29 | 308.93 | 106.56 | 161.28 | 308.98 |
| Min insertion delay in 1.2 V domain | 115.23 | 145.07 | 239.61 | 129.89 | 164.77 | 269.51 |
| Max insertion delay in 1.2 V domain | 115.53 | 145.62 | 240.77 | 130.04 | 165.12 | 270.21 |
| Global Skew | 10.89 | 16.22 | 68.16 | 25.4 | 7.61 | 39.47 |

Methods for Synthesizing Multi-Corner Mesh-Based Clock Distribution Network

Figure 3:
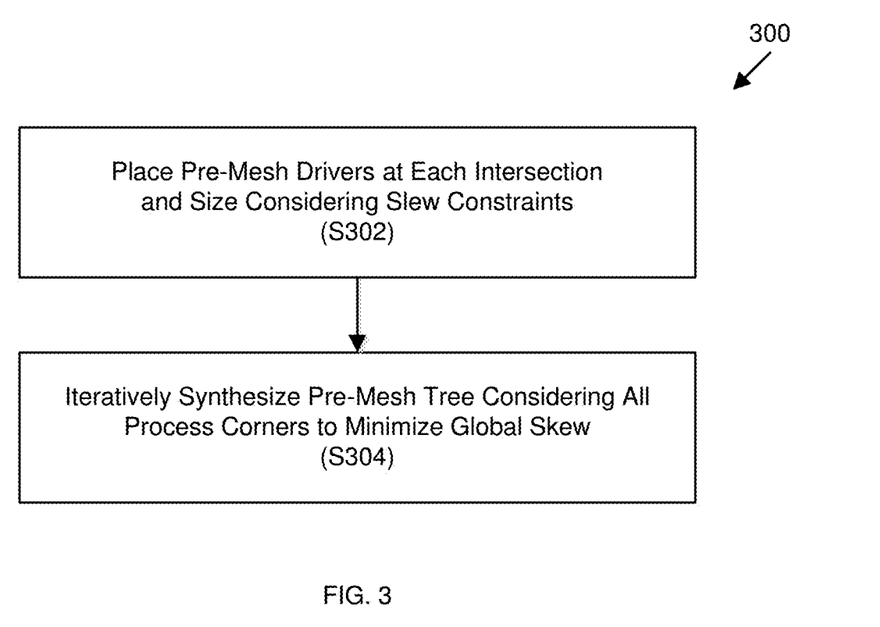
FIG. 3 depicts a method of synthesizing a multi-corner mesh-based clock distribution network in a multi-voltage design flow according to an embodiment of the invention.

Referring now to FIG. 3, a new method 300 of synthesizing a multi-corner mesh-based clock distribution network in a multi-voltage design flow is proposed. By considering multiple process corners at the same time, variation-tolerance is targeted. The steps of method 300 are as follows. Given an initial placement and the mesh size: in step S302, pre-mesh drivers are placed at each intersection and sized considering the slew constraints as discussed in greater detail in the context of Appendix A—Algorithm 1; and in step S304, a pre-mesh tree is synthesized iteratively considering all process corners to minimize the global skew as discussed in the context of Appendix B—Algorithm 2 and method 400 depicted in FIG. 4.

For the multi-voltage clock mesh, local meshes are placed for each domain with their own pre-mesh trees. The roots of the pre-mesh trees of each domain can be connected to a master root through level shifters, however, these level shifters are not strictly necessary. The virtual root of each domain can function as a level shifter, instead, if the source voltage swing is higher than that of the supply voltage at the root. In order to eliminate the extra power cost, embodiments of the invention omit level shifters as shown in FIG. 1B. The highest voltage in the design is assumed to be the voltage swing of the clock source connection of the multi-voltage clock mesh design without loss of generality of the presented work. Buffer driver selection and sizing, and the pre-mesh tree synthesis procedures are presented in the "Pre-Mesh Driver Selection" and "Multi-Corner Pre-mesh Tree Synthesis" subsections herein, respectively.

The proposed methodology is independent of the pre-mesh driver sizing algorithm; any alternative, more (or less) sophisticated method for pre-mesh driver sizing can be seamlessly integrated, which demonstrates the practicality of the proposed method for automation purposes. Furthermore, although the algorithms presented in this work are designed for any number of voltage domains, it is important to note that the number of voltage domains is 2 in the selected technology library, which is also the same library and setup in C. Sitik & B. Taskin, "Multi-voltage domain clock mesh design," in *Proceedings of the IEEE International Conference on Computer Design (ICCD)* 201-06 (2012) (hereinafter "Sitik & Taskin 2012"), against which the results are compared.

Pre-Mesh Driver Selection

In step S302, a simple heuristic is used to select the pre-mesh driver buffers. First, maximum size buffers in the library are placed at each intersection point of the clock mesh, then, the buffer sizes are decreased iteratively until the maximum slew exceeds the slew constraint at any of the corners. Notably, maximum size buffers are selected at the beginning and downsizing is performed iteratively. This approach decreases the number of iterations, especially when slew constraints are tighter and larger size buffers are needed.

The slew constraint $slew_{const}$ can be set to its typical value of 5% of the clock period, although it can be set to another value depending on the performance requirements. This constraint can be degraded by the synthesized pre-mesh tree in the following procedure, yet the slew target needs to be selected in this stage as it is used as a guide that drives the pre-mesh tree synthesis stage.

In the pre-mesh driver selection procedure, all buffers are sized down at the same time with an identical scale for the sake of simplicity. This procedure is shown in Appendix A—Algorithm 1.

Multi-Corner Pre-Mesh Tree Synthesis

Step S304 synthesizes a pre-mesh tree to optimize the global skew considering all process corners simultaneously. This stage also considers the slew at the sinks, not to degrade the slew more than an allowed margin within the slew budget, as the maximum slew considered in step S302 is not completely independent from the pre-mesh tree. It is important to note the significance of the proposed skew-and-slew budgeted multi-corner, multi-voltage clock mesh design methodology within the current state of the art clock mesh design automation—in the multi-voltage design flow, standard electronic design automation (EDA) tools cannot match the insertion delays of the pre-mesh trees driving clock meshes that belong to different voltage domains even in a single corner. The invention provided herein provides an iterative algorithm to accomplish this task at all process corners. In the algorithm, the pre-mesh tree is synthesized iteratively, until the lowest over-all (e.g., global) skew at all corners is achieved. This procedure is shown in Appendix B—Algorithm 2 and is further described in FIG. 4.

Figure 4:
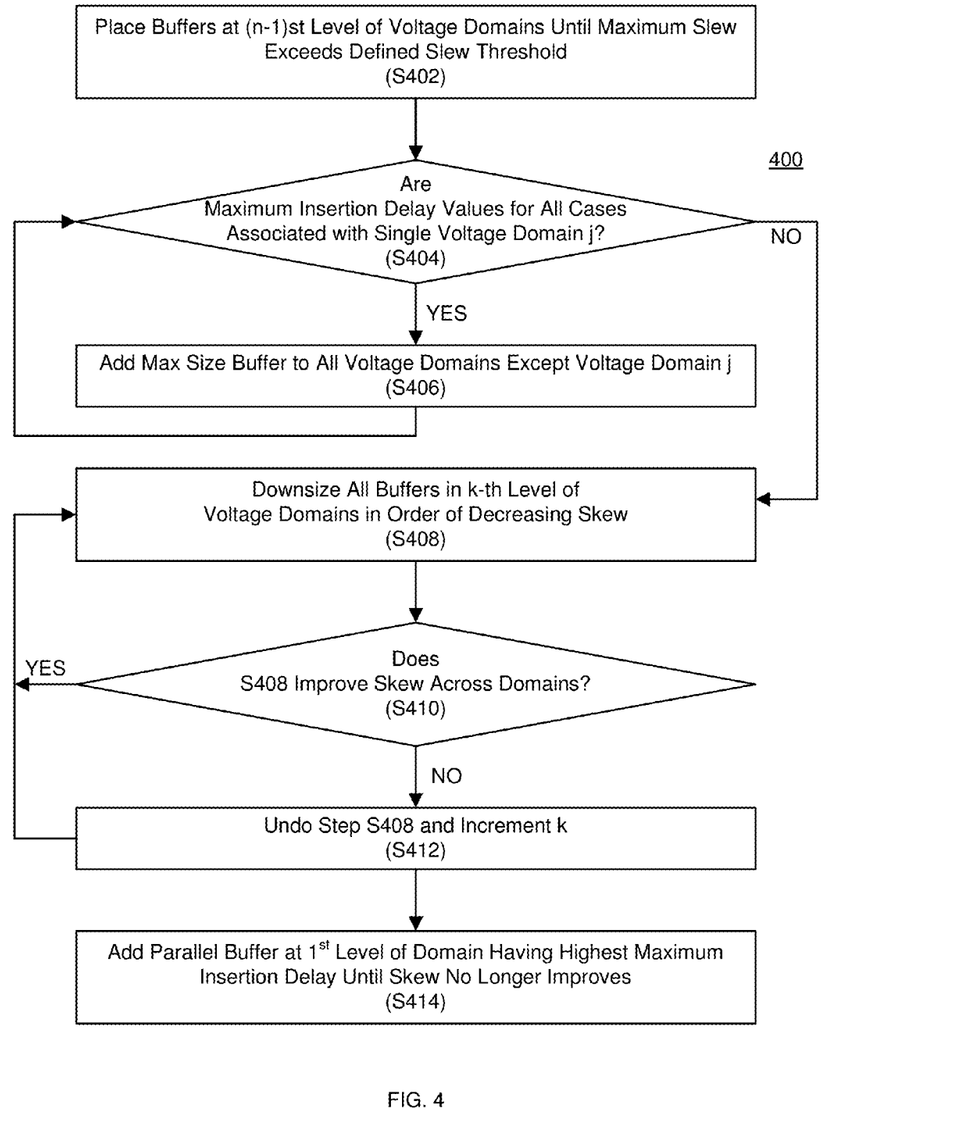
FIG. 4 depicts a method of synthesizing a multi-corner mesh-based clock distribution network in a multi-voltage design flow according to an embodiment of the invention.

In step S402, the (n−1)st level of the pre-mesh tree is first synthesized with the maximum size buffers in an N×N topology. The iterations starts (generically) with N=1, and it is increased by 1 (also generically) at each iteration until the slew constraint with the degradation margin is met at all corners. In step S404, the insertion delays are measured to see if the maximum insertion delay path is in the same domain for all cases. If so, a maximum size buffer is added in the next level of each domain other than the maximum insertion delay domain in step S406 because it is an undesired case, as explained in the "Insertion Delay and Its Variation in Multi-Voltage Designs" subsection herein. The purpose of selecting maximum size buffers in this stage is the fact that having less number of levels in the pre-mesh tree with larger size buffers is more variation-tolerant than having more number of levels with smaller buffers. The buffer-adding stage (S404 and S406) ends when the maximum insertion delay paths are no longer encountered in the same domain for different corners.

The buffer-adding stage (S404 and S406) is followed by the buffer-sizing stage (S408, S410, and S412). In the buffer-sizing stage (S408, S410, and S412), the buffers are downsized starting from the first level of the domain whose maximum insertion delay path sets the global skew (S408). If downsizing improves the skew, that step is performed (S410). Otherwise, that step is undone and that level is marked as "done" (S412). Downsizing continues with the next maximum insertion delay domain and finalizes when all levels of all domains are marked as "done".

After that, the pruning stage (S414) starts. In this last stage, the number of levels or the sizes of the buffers are unchanged, but parallel buffers of the same sizes are added at the first level of the maximum insertion delay domain iteratively as long as the global skew is improved. The algorithm is a heuristic and does not guarantee an optimal solution. However, the algorithm is scalable with a complexity of O(n) for n voltage domains and m process corners. The complexity is linear because the algorithm visits every domain a constant number of times, at each stage of the algorithm and simulates for the best and the worst cases only.

Working Examples

Embodiments of the invention were implemented with Tcl in order to inter-operate with standard EDA tools and tested on benchmark circuits created with two voltage domains. The selected SYNOPSYS® SAED 90nm EDK library has two voltage levels, a high voltage at 1.2V and a low voltage at 0.8V. For testing purposes, four benchmark circuits were created by placing different combinations of the three largest circuits of ISCAS'89 benchmarks, s35932, s38417 and s38584 within two voltage domains. These combinations are shown in Table 3.

TABLE 3

Benchmark circuit combinations

|  | 0.8 V Domain | 1.2 V Domain |
| --- | --- | --- |
| Benchmark 1 | s35932 | s38417 |
| Benchmark 2 | s38417 | s35932 |
| Benchmark 3 | s35932 | s38584 |
| Benchmark 4 | s38584 | s35932 |

Certain simplifications were imposed in these Working Examples, such as choosing identical size buffers, which degrade the quality of the solution, but are sufficient to demonstrate both the novelty and the efficacy of the invention.

The register transfer language (RTL) level designs were synthesized using Design Compiler of Synopsys and the placement of the circuits are performed using SYNOPSYS® IC COMPILER™. The skew and the power analysis were performed using SYNOPSYS® CUSTOMSIM™ XA simulator at the SPICE accuracy level with the SPICE models. Due to the tight slack constraints at the domain that operates at 0.8V, 500 MHz was selected as the operating frequency. In order to verify the variation-tolerance, all tests were performed at the following three different process corners:
1. Best Corner (BC): V=Vdd+10%, T=−40° C., fast transistors
2. Nominal Corner (NC): V=Vdd, T=25° C., typical transistors
3. Worst Corner (WC): V=Vdd−10%, T=125° C., slow transistors In order to compare the quality of results with the standard single-voltage mesh and the results of Sitik & Taskin 2012, the following procedure was performed. First, the same circuits were synthesized with a single-voltage domain mesh whose pre-mesh drivers were sized using the proposed method described in the "Pre-mesh Driver Selection" subsection herein. The mesh size was selected as 10×10, similar to Sitik & Taskin 2012, to have a fair comparison.

Figure 5:
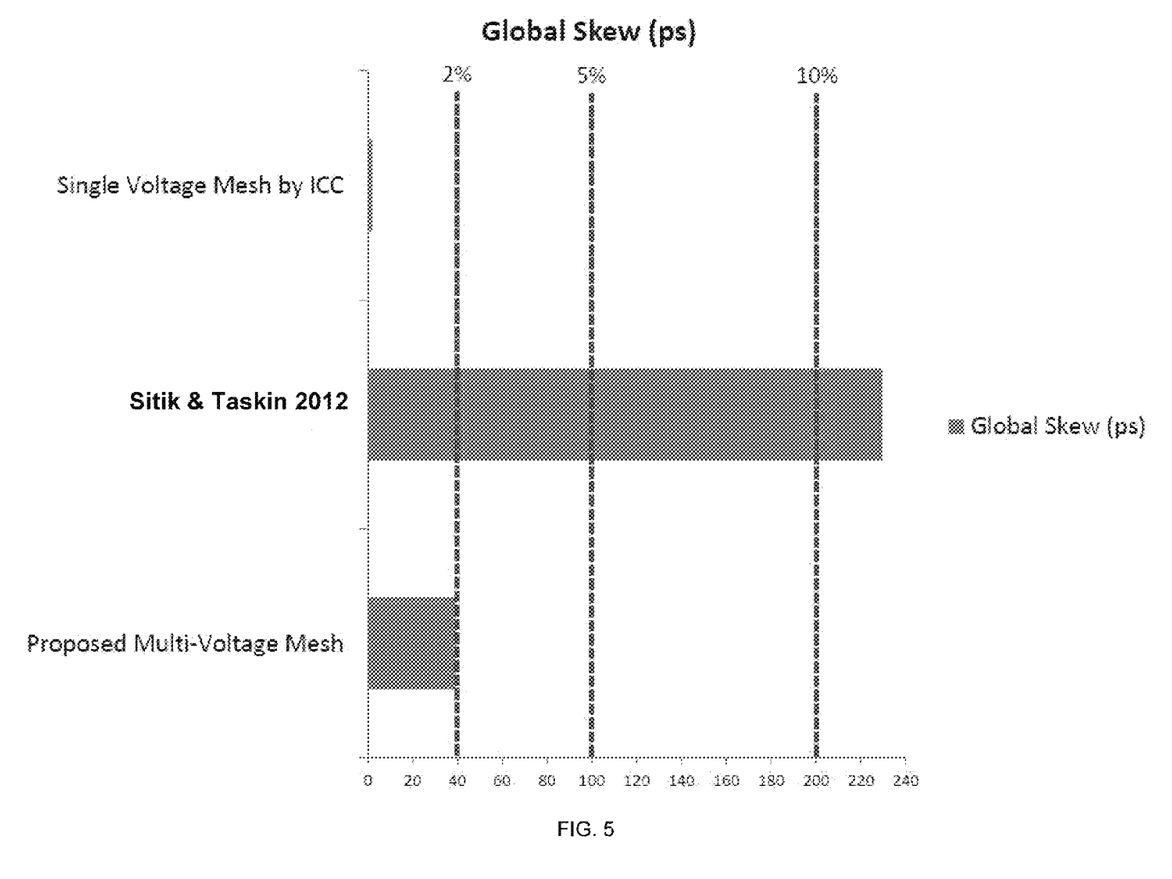
FIG. 5 depicts a skew comparison of an embodiment of the invention against typical skew budgets.

The method described herein was applied to the four benchmarks in Table 3. The pre-mesh buffer sizing step S302 required two iterations, and the pre-mesh tree synthesis stage step S304 took nine iterations at most to converge. The experimental results are shown in Table 4 and Table 5. Recall that the contemporary practical objective in clock distribution network design is to optimize power within a given skew/slew bound. It is visible from Table 4 that a single voltage mesh is the best in terms of clock skew, as the single voltage mesh (famously) has a very high variation-tolerance. One important contribution of this invention, is that, when multi-voltage designs are implemented, the clock mesh can preserve its variation-tolerance while reducing the power dissipation through multi-Vdd design. Embodiments of the invention can achieve up to 42% less power consumption in the clock network compared to a single voltage mesh. The skew increases from 1.73 ps to 39.04 ps on average, as shown in Table 5, yet is still as low as 1.95% of the clock period so well within the skew budget. In comparison, note that the previous single-corner work in Sitik & Taskin 2012 does not satisfy the 5% (or 10%) skew budget at 229.46 ps (11.5% of the clock period, on average), as highlighted in FIG. 5.

TABLE 4

Power comparison over single-voltage domain mesh and Sitik & Taskin 2012 at 3 corners (BC, NC and WC)

| Circuits | SV Mesh Synthesized By ICC | | | Sitik & Taskin 2012 | | | Inventive Method | | |
| --- | --- | --- | --- | --- | --- | --- | --- | --- | --- |
| | BC (mW) | NC (mW) | WC (mW) | BC (mW) | NC (mW) | WC (mW) | BC (mW) | NC (mW) | WC (mW) |
| Benchmark 1 | 467.64 | 112.69 | 201.89 | 272.56 | 66.52 | 137.90 | 304.19 | 82.97 | 132.72 |
| Benchmark 2 | 502.04 | 128.33 | 220.41 | 219.09 | 80.28 | 148.54 | 254.88 | 95.96 | 140.25 |
| Benchmark 3 | 385.19 | 93.17 | 178.90 | 197.55 | 48.34 | 104.18 | 231.41 | 64.51 | 102.70 |
| Benchmark 4 | 434.58 | 106.73 | 184.59 | 212.60 | 72.29 | 145.62 | 239.84 | 88.26 | 132.65 |
| Avg. % Improvement | | | | 49% | 40% | 32% | 42% | 25% | 35% |

TABLE 5

Skew comparison over single-voltage domain mesh and Sitik & Taskin 2012 at 3 corners (BC, NC and WC) (overall skew is denoted in bold font)

| Circuits | SV Mesh Synthesized By ICC | | | Sitik & Taskin 2012 | | | Inventive Method | | |
| --- | --- | --- | --- | --- | --- | --- | --- | --- | --- |
| | BC (ps) | NC (ps) | WC (ps) | BC (ps) | NC (ps) | WC (ps) | BC (ps) | NC (ps) | WC (ps) |
| Benchmark 1 | 1.30 | 0.97 | 0.63 | 228.03 | 21.06 | 177.31 | 40.17 | 20.16 | 28.80 |
| Benchmark 2 | 1.54 | 2.65 | 4.03 | 227.41 | 21.64 | 178.73 | 38.88 | 18.54 | 30.94 |
| Benchmark 3 | 2.53 | 1.90 | 1.19 | 229.58 | 20.60 | 179.16 | 30.26 | 9.99 | 39.11 |
| Benchmark 4 | 1.56 | 1.25 | 0.76 | 232.82 | 16.42 | 170.09 | 30.26 | 10.14 | 38.00 |
| Avg. Skew | | 1.73 | | | 229.46 | | | 39.04 | |
| Degradation | | | | | −227.73 | | | −37.31 | | section herein. For consistency, the pre-mesh trees were synthesized using SYNOPSYS® IC COMPILER™ software in the multi-corner mode. Then, a custom implementation of the multi-voltage domain clock mesh design algorithm in Sitik & Taskin 2012 was applied on the same circuits to compare to the proposed work. The maximum slew $slew_{const}$ was selected as 100 ps, with a degradation margin allowance in pre-mesh tree synthesis of 20% totaling to a slew budget of 120 ps, as explained in the "Pre-mesh Driver Selection" and "Multi-Corner Pre-mesh Tree Synthesis" subsections herein.

It is reported in Table 4 that the power dissipation in the multi-voltage clock network is much lower compared to a single voltage clock mesh. The total power savings on the multi-voltage circuit will be even higher considering the additional savings on the logic, which are not reported here (as total power savings depend on the particular voltage domain partitioning technique and may sway the results). There is a 15% degradation in power consumption in the nominal case over the single-corner design in Sitik & Taskin 2012, as optimization at multiple corners is considered. The 15% power degradation, thus, is not a penalty but a necessity to achieve a slew- and skew-constrained design. The slew constraint in Sitik & Taskin 2012 is 120 ps in the nominal case, but it is observed to be 240 ps in the worst case, which requires an extravagant 12% slew budget. In comparison, the worst case slew budget in this paper is 120 ps, which is satisfied at 108 ps, 5.4% of the period, in the worst case. For variation-awareness, and the saved timing slack, the power consumption is degraded by 15% in the nominal case. This degradation is 7% in the best case corner, and there is a 3% improvement in the worst case corner, which highlights the multi-corner optimization objective of the proposed work.

CONCLUSIONS

Aspects of the invention provide a new methodology to synthesize variation-tolerant, multi-voltage, single clock domain clock meshes for high performance ICs. The proposed method enables a multi-corner clock mesh synthesis on designs with multiple voltage domains. Embodiments of the invention enable slew-and-skew budgeted pre-mesh clock tree design at all process-voltage-temperature (PVT) corners for high practicality. The elegantly simple algorithm provided herein was used to size the pre-mesh drivers to highlight the elegance of multi-corner optimized multi-voltage domain clock meshes and can easily be combined with existing buffer sizing algorithms for improved results and a wide practical applicability. If more than two voltage levels are available, aspects of the invention can achieve a wide range in the skew vs. power curve by exploiting different voltage levels for different performance requirements.

Implementation in Computer-Readable Media and/or Hardware

The methods described herein can be readily implemented in software that can be stored in computer-readable media for execution by a computer processor. For example, the computer-readable media can be volatile memory (e.g., random access memory and the like) non-volatile memory (e.g., read-only memory, hard disks, floppy disks, magnetic tape, optical discs, paper tape, punch cards, and the like). In one embodiment, the methods described herein can be implemented as part of a larger electronics design automation software package such as those produced by Synopsys, Inc.

Additionally or alternatively, the methods described herein can be implemented in computer hardware such as an application-specific integrated circuit (ASIC).

EQUIVALENTS

Those skilled in the art will recognize, or be able to ascertain using no more than routine experimentation, many equivalents of the specific embodiments of the invention described herein. Such equivalents are intended to be encompassed by the following claims.

INCORPORATION BY REFERENCE

The entire contents of all patents, published patent applications, and other references cited herein are hereby expressly incorporated herein in their entireties by reference.

APPENDIX A

Algorithm 1 Pre-Mesh Driver Selection

Input: Mesh size for each voltage domain i, buffer library, slew constraint slew $slew_{const}$
Output: The sizes of each pre-mesh driver buffers
for Each voltage domain i do
    Place maximum size buffer at each intersection
    Calculate $slew_{max}^i$
    while $slew_{max}^i < slew_{const}$ do
        Replace all buffers with the next smaller buffer cell in the library
        Update $slew_{max}^i$
    end while
end for
Return the selected driver for each domain i

APPENDIX B

Algorithm 2 Multi-Corner Multi-Voltage Domain Pre-Mesh Tree Synthesis

Input: Pre-mesh drivers for each domain, assigned voltage for each domain, buffer library for each domain i and each corner c, slew constraint $slew_{const}$
Output: Pre-mesh tree for each domain i
Set N = 1
while $slew_{max} < slew_{const} + slew_{margin}$ do
    Place N × N max size buffers at the (n−1)st level of each domain i
    N = N + 1
end while
if max insertion delay is in the same domain for all cases then
    while max insertion delay is still at the same domain j do
        Add a max size buffer of that voltage domains other than j
    end while
end if
$curr_{skew} = \max_{\forall c} (\max_{\forall i}(delay_{max}^i) - \min_{\forall i}(delay_{min}^i))$
$prev_{skew} = T$
while $k_j <$ num-of-levels-in-j do
    Downsize the k-th level of the max insertion delay domain j
    $prev_{skew} = curr_{skew}$
    $curr_{skew} = \max_{\forall c} (\max_{\forall i}(delay_{max}^i) - \min_{\forall i}(delay_{min}^i))$
    if $curr_{skew} > prev_{skew}$ then
        Undo that step, mark k-th level as done
        $k_j = k_j + 1$
    end if
end while
while $curr_{skew} > prev_{skew}$ do
    Add parallel buffers at the max insertion delay domain at the first level
    $curr_{skew} = prev_{skew}$
    $curr_{skew} = \max_{\forall c} (\max_{\forall i}(delay_{max}^i) - \min_{\forall i}(delay_{min}^i))$
end while

The invention claimed is:

1. An integrated circuit including a multi-corner mesh-based clock distribution network synthesized according to a method comprising:
(a) for each of a plurality of voltage domains, placing N×N max size buffers at an (n−1)st level of one of the voltage domains i until a maximum slew $slew_{max}$ within the voltage domain i exceeds a defined slew threshold;
(b) calculating maximum insertion delay values for all cases for each of the voltage domains;
(c) if the maximum insertion delay values for all cases are associated with a single voltage domain j:
(i) adding a max size buffer to all voltage domains except voltage domain j; and
(ii) repeating steps (b) and (c);
(d) reducing buffer sizes for each of the voltage domains, in order of decreasing skew, by:
(i) downsizing all buffers in a k-th level of the voltage domain;

(ii) if the downsizing step (i) does not improve a calculated skew across the plurality of voltage domains, (1) undoing the downsizing step (d)(i) and (2) performing substep (i) for the k+1th level of the voltage domain; and (iii) otherwise, repeating substep (d)(i);

(e) recalculating maximum insertion delay values for all cases for each of the voltage domains; and (f) adding parallel buffers to a first level of the voltage domain having a highest maximum insertion delay until the calculated skew across the plurality of voltage domains no longer improves.

2. The integrated circuit of claim 1, wherein the integrated circuit is an application-specific integrated circuit.

3. The integrated circuit of claim 1, wherein the integrated circuit has multiple voltage islands sharing a single clock domain.

\* \* \* \* \*